(12) United States Patent
Imaoka

(10) Patent No.: US 7,748,855 B2
(45) Date of Patent: Jul. 6, 2010

(54) IMAGE PROJECTION APPARATUS

(75) Inventor: Masayuki Imaoka, Izumiotsu (JP)

(73) Assignee: Konica Minolta Opto, Inc., Hachioji-shi (JP)

(*) Notice: Subject to any disclaimer, the term of this patent is extended or adjusted under 35 U.S.C. 154(b) by 620 days.

(21) Appl. No.: 11/700,615

(22) Filed: Jan. 31, 2007

(65) Prior Publication Data

US 2007/0182938 A1     Aug. 9, 2007

(30) Foreign Application Priority Data

Feb. 7, 2006  (JP) .............................. 2006-029551

(51) Int. Cl.
G03B 21/14   (2006.01)
G03B 21/28   (2006.01)
G03B 21/22   (2006.01)
G02B 5/10    (2006.01)

(52) U.S. Cl. .............................. 353/97; 353/78; 353/99; 359/864

(58) Field of Classification Search .................... 353/98, 353/99, 77, 78, 75, 97; 348/781, 782, 744; 359/864, 449

See application file for complete search history.

(56) References Cited

U.S. PATENT DOCUMENTS

| 5,390,050 | A  | * | 2/1995  | Yanagi et al. ............... 359/742 |
| 5,477,394 | A  | * | 12/1995 | Shibazaki .................... 359/858 |
| 6,752,500 | B1 |   | 6/2004  | Yoshii et al. .................. 353/78 |
| 6,805,447 | B2 | * | 10/2004 | Takeuchi ..................... 353/71 |
| 7,055,960 | B2 | * | 6/2006  | Chang et al. .................. 353/77 |
| 7,503,661 | B2 | * | 3/2009  | Masubuchi et al. ........... 353/99 |

FOREIGN PATENT DOCUMENTS

JP         2004-295042 A     10/2004

* cited by examiner

Primary Examiner—Georgia Y Epps
Assistant Examiner—Ryan Howard
(74) Attorney, Agent, or Firm—Sidley Austin LLP

(57) ABSTRACT

A projector includes a plane mirror that is disposed at one end side of an end portion of a screen and a projection optical system that is disposed at a position that is separated from a reflection surface side of the plane mirror. A light shielding plate is provided to at least one of two positions; one is between a fourth mirror and the plane mirror of the projection optical system, and the other is between the plane mirror and the screen.

12 Claims, 7 Drawing Sheets

IMAGE PROJECTION APPARATUS

This application is based on Japanese Patent Application No. 2006-029551 filed on Feb. 7, 2006, the entire contents of which are hereby incorporated by reference.

BACKGROUND OF THE INVENTION

1. Field of the Invention

The present invention relates to an image projection apparatus (e.g., a projector) for projecting an image to a screen.

2. Description of Related Art

Recently, various types of projectors have become widespread. One of them is a projector PD' disclosed in U.S. Pat. No. 6,805,447 B2 (hereinafter referred to as a patent document 1). This projector PD', as shown in FIG. 7, uses a projection optical system PS' that has a compact size and is capable of wide angle projection of image light to the rear surface of a screen SCN'. Such a projector PD' is called a rear projector PD' and is popular to users because it can save a space even in a small room.

In addition, the projector PD' of the patent document 1 has a plane mirror MF' disposed at a vicinity of the upper end of the screen SCN' for leading image light from the projection optical system PS'. Therefore, the projection optical system PS' can be disposed behind the screen SCN'. As a result, the height of the projector PD' can be controlled. In other words, the projector PD' is a projector PD' having a short depth and a low height.

However, the projector PD' of the patent document 1 has a disadvantage that part of image light to enter the plane mirror MF' via the projection optical system PS' may deviate from its optical path and may enter directly to the screen SCN'. Such part of image light is indicated by an arrow G1' in FIG. 7, for example. If this image light G1' enter the screen SCN', image quality of the projector PD' is deteriorated, which is undesired result.

Furthermore, if a space between the projection optical system PS' and the screen SCN' is reduced for realizing thinner projector PD' of the patent document 1, the image light that enters the screen SCN' from the plane mirror MF' may deviate from a normal optical path and may enter a member for holding the projection optical system PS' (a holder member, not shown), and further may be reflected after that. In this case, part of the reflected image light is indicated by an arrow G2' in FIG. 7, for example. If this image light G2' also enters the screen SCN', image quality of the projector PD' is deteriorated, which is undesired result.

SUMMARY OF THE INVENTION

An object of the present invention is to provide an image projection apparatus that can improve image quality by suppressing generation of the image light that causes deterioration of image quality (also referred to as ghost light).

An image projection apparatus is equipped with a projection optical system including a plurality of optical elements for emitting image light via the optical elements, and a mirror for reflecting the image light from the projection optical system so as to lead the image light to a screen. The mirror is disposed at one end side of an end portion of the screen, while the projection optical system is disposed at a position separated from a reflection surface side of the mirror. In addition, one of the optical elements disposed at a position that is closest to the mirror in the optical path of the projection optical system is a reflection type optical element.

Moreover, image projection apparatus is equipped with an image display element for displaying a two-dimensional image, a projection optical system for projecting an image on the image display element to a screen from an oblique direction, a plane mirror for reflecting image light from the projection optical system toward the screen, and a light shielding member.

In the image projection apparatus described above, the projection optical system includes a reflection type optical element disposed at a position that is closest to the screen in the optical path of the projection optical system. In addition, the plane mirror is disposed at one end side of the screen in a position substantially perpendicular to the screen surface. Furthermore, the light shielding member is disposed at a position that is close to an intersection of an optical paths of first image light that is projected from the projection optical system via the plane mirror to an end portion of the screen facings the plane mirror and second image light that is projected from the projection optical system via a plane mirror to an end portion of the screen facing opposed to an end portion of the screen facing the plane mirror, and that is located outside the optical path of the projection optical system and adjacent to the optical paths of the first image light and the second image light.

The objects of the present invention described above and features thereof will be more clear by the following description about the preferred embodiments with reference to the attached drawings.

DETAILED DESCRIPTION OF THE PREFERRED EMBODIMENTS

First Embodiment

An embodiment of the present invention will be described as below with reference to the attached drawings.

[1. Projector]

Figure 2:
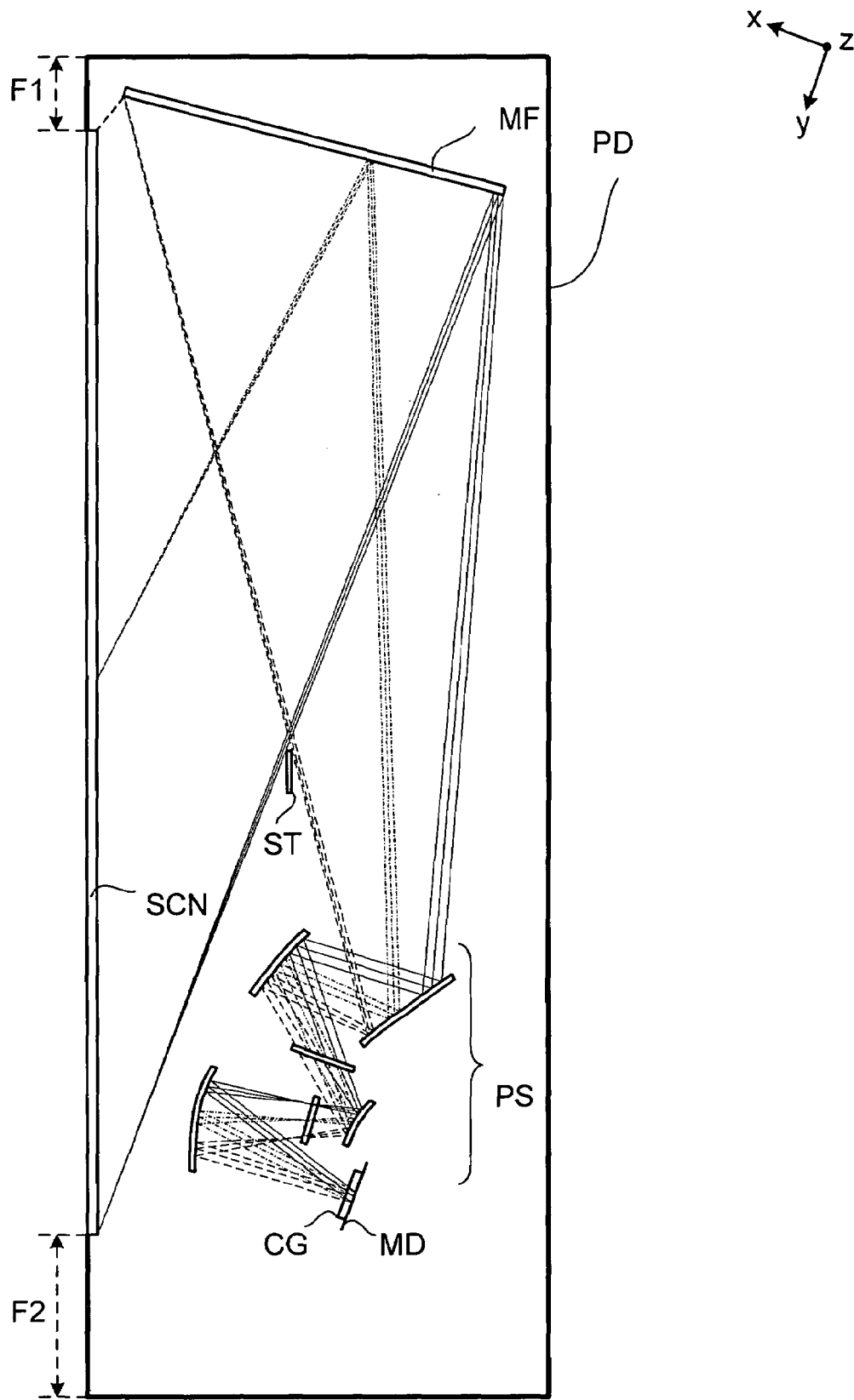
FIG. 2 is a diagram showing a schematic structure of the image projection apparatus.

As an example of image projection apparatuses, there is a projector PD whose general structure is shown in FIG. 2. This projector PD includes a light modulation element MD, a cover glass CG, a projection optical system PS, a plane mirror MF, a screen SCN and a light shielding plate ST. The projector PD is a rear projection type projector (a rear projector) PD that expands and projects image light from the light modulation element MD (reduction side) toward the rear surface of the screen SCN (enlargement side) from an oblique direction.

Furthermore, FIG. 2 shows a xy cross section in the xyz orthogonal coordinate system (see FIG. 3) of the right-handed system having the following characteristics.

x direction is the normal direction to a panel display surface sp of the light modulation element MD.

y direction is perpendicular to the x direction and is the same direction as the short side direction of the panel display surface sp.

z direction is perpendicular both to the x direction and to the y direction and is the same direction as the long side direction of the panel display surface sp.

Figure 1:
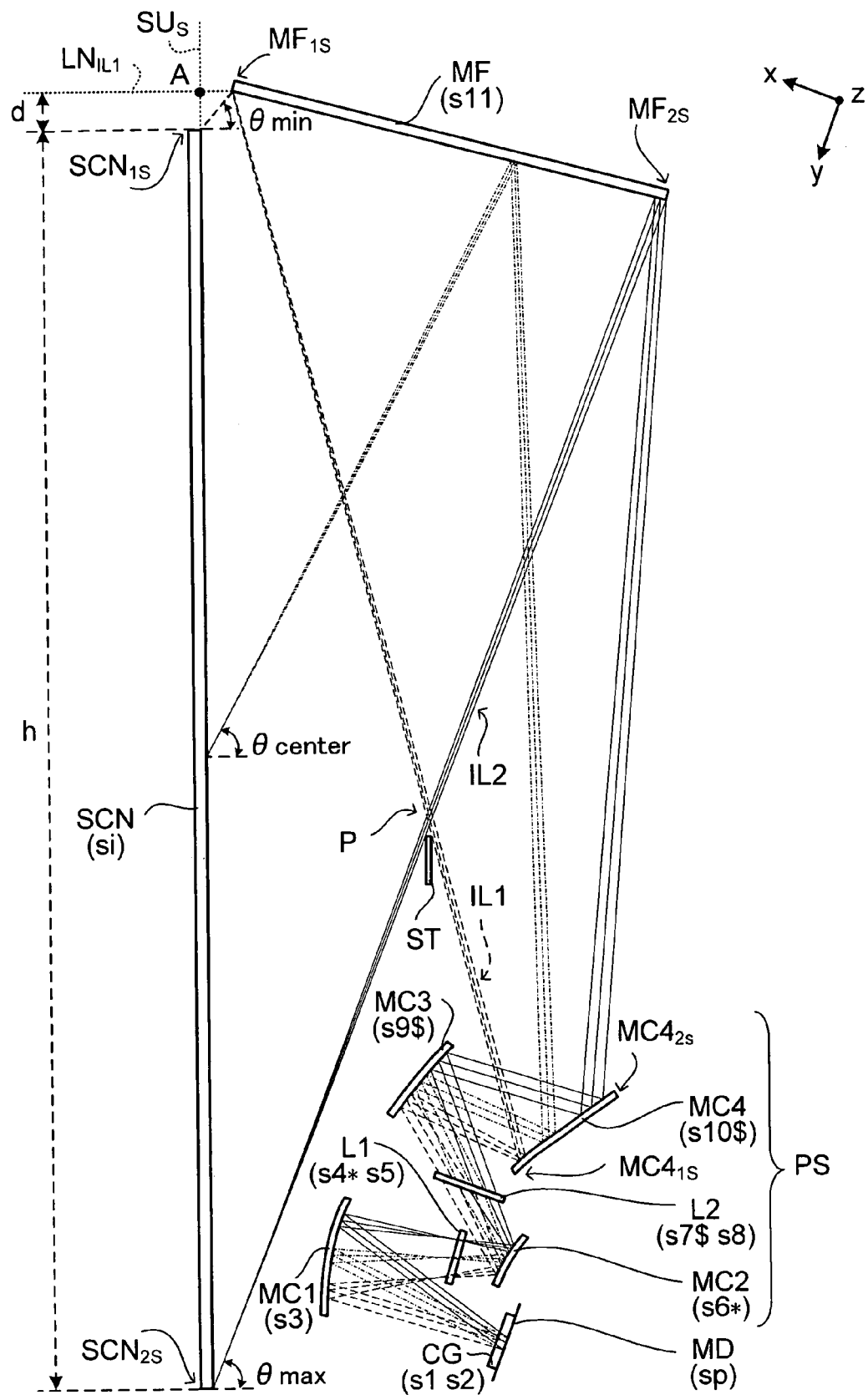
FIG. 1 is a cross section showing an image projection apparatus shown in FIG. 2 in detail.
Figure 4:
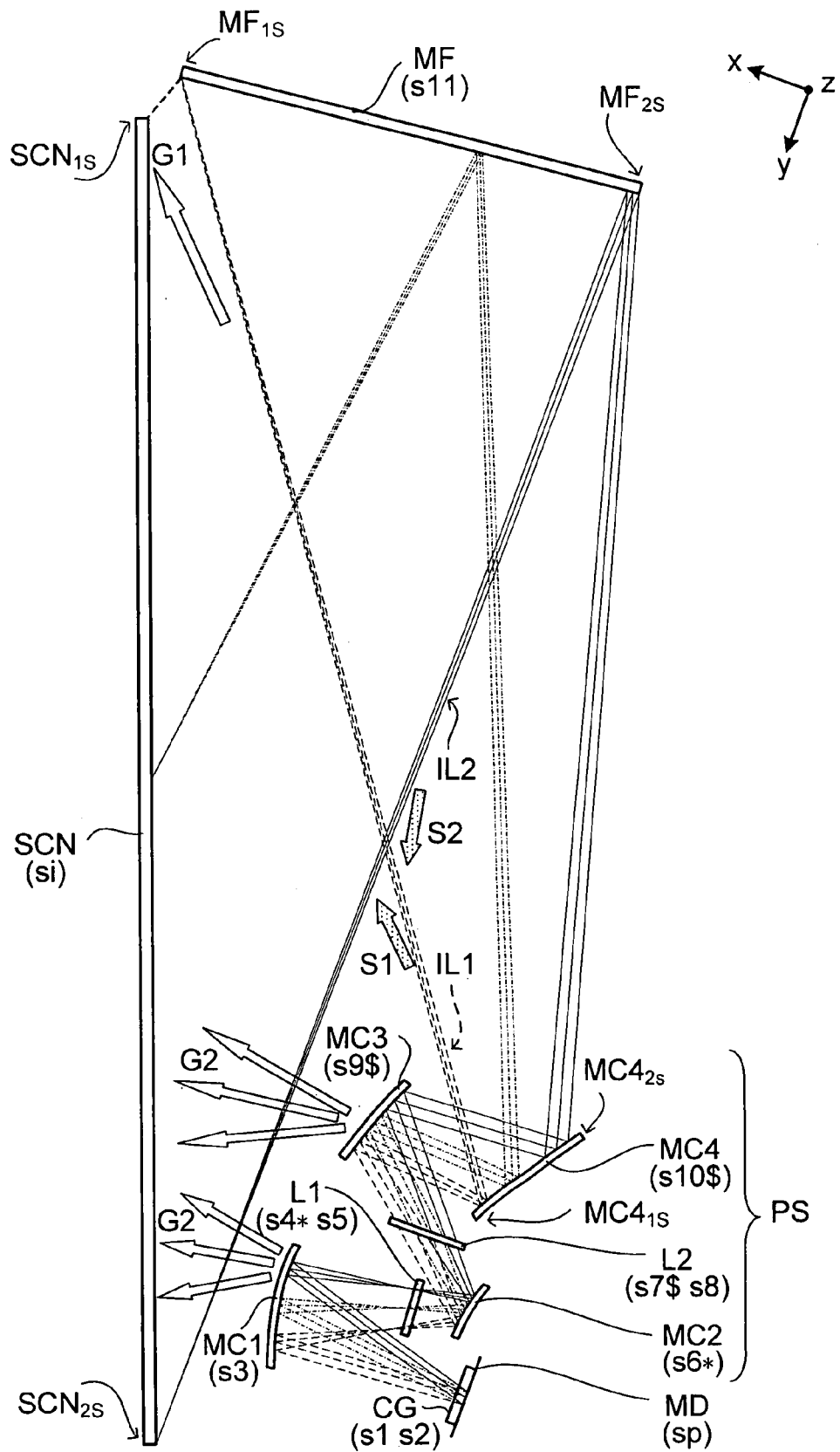
FIG. 4 is an explanatory diagram showing image light that deviates from a normal optical path and the state where the image light enters a screen.
Figure 5:
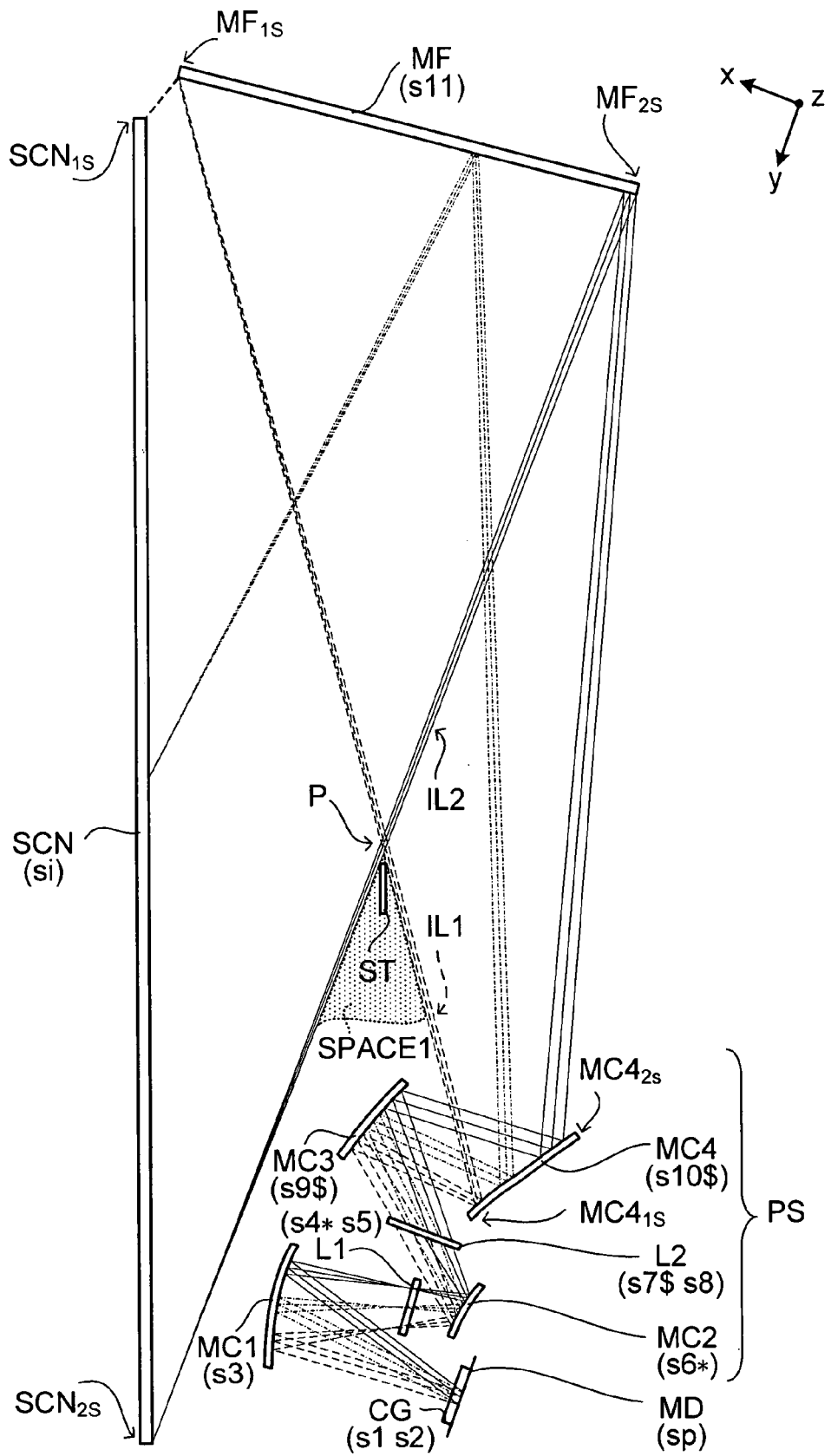
FIG. 5 is an explanatory diagram showing a desirable position of a light shielding plate.

In addition, the xyz orthogonal coordinate system is specified also in other drawings (FIGS. 1, 4 and 5). However, directions of the x coordinate and the y coordinate of the xyz orthogonal coordinate system indicate positive directions in the drawings. In contrast, direction of the z coordinate is perpendicular to the paper and is toward the front side, which indicates a positive direction of the z coordinate.

Moreover, in FIG. 1 that is a detail drawing of FIG. 2, an optically acting surface for leading light from the light modulation element MD (the panel display surface sp) to the screen SCN (the screen surface si) is denoted by sn, and the suffix number (n=1, 2, 3 . . . ) is added in the order of passing or reflecting light (in other words, the suffix number appears in the ascending order as the light approaches the screen si on the optical path). In addition, a suffix sign "*" is added for the optically acting surface having an aspheric surface of rotational symmetry, while suffix sign "$" is added for the optically acting surface having an aspheric surface of rotational asymmetry (a free-form surface).

The light modulation element (the image display element) MD receives light from the light source (not shown) and modulates the light based on image data or the like. As such light modulation elements MD, there are a DMD (Digital Micromirror Device provided by Texas Instruments in the U.S.A.) and a liquid crystal display element, for example. Note that a display element of a self light emission type may be used instead of the light modulation element MD. If a display element of a self light emission type is used instead of the light modulation element MD, a light source or the like for illumination becomes unnecessary. As a result, an optical structure can be realized in light weight and compact size.

The cover glass CG protects the front surface of the light modulation element MD (an emission plane of modulated light or a panel display surface sp). Although the cover glass CG has two surfaces (s1 and s2) but does not have a power (a refracting power).

The projection optical system PS includes a reflection type optical element such as a mirror and a transmission type optical element such as a lens. The projection optical system PS receives light (image light) modulated by the light modulation element MD and emits the light toward plane mirror MF. More specifically, the projection optical system PS includes a first mirror MC1, a first lens (first refractive optical element) L1, a second mirror MC2, a second lens (second refractive optical element) L2, a third mirror MC3 and a fourth mirror MC4. The image light travels via these optical elements MC1, L1, MC2, L2, MC3 and MC4 in this order.

The optical elements have the following characteristics.

The first mirror MC1 is a curved surface mirror having a curved reflection surface like a spherical surface (first reflection surface with a concave surface) s3.

The first lens L1 is a rotationally symmetric and aspheric lens with substantially non-power having an aspheric incidence plane s4* of rotational symmetry on the reduction side and a flat emission plane s5 on the enlargement side. However, the first lens L1 performs various aberration corrections though its power is weak.

The second mirror MC2 is a curved surface mirror having a rotationally symmetric and aspheric curved reflection surface (second reflection surface with a convex surface) s6*.

The second lens L2 is a rotationally asymmetric free-form surface lens with substantially non-power having an incidence plane s7$ of rotational asymmetry like a free-form surface on the reduction side and a flat emission plane s8 on the enlargement side. However, the second lens L2 performs various aberration corrections in the same manner as the first lens L1.

The third mirror MC3 is a curved surface mirror having a curved reflection surface like a rotationally asymmetric free-form surface (third reflection surface) s9$.

The fourth mirror MC4 is a curved surface mirror having a curved reflection surface like a rotationally asymmetric free-form surface (fourth reflection surface) s10$. Furthermore, in the curved reflection surface s10$, an end portion ("end portion" means a side or a corner in a surface) that is farthest from the plane mirror MF is referred to as a "first end portion $MC4_{1S}$ of the fourth mirror MC4." On the other hand, in the curved reflection surface s10$, an end portion that is nearest to the plane mirror MF (an end portion that is opposed to the first end portion $MC4_{1S}$ of the fourth mirror MC4) is referred to as a "second end portion $MC4_{2S}$ of the fourth mirror MC4."

The plane mirror MF reflects the traveling image light (projection light) led by the projection optical system PS with the reflection surface s11 so as to lead the image light to the screen SCN (screen surface si).

Furthermore, in the reflection surface s11, an end portion that is nearest to the screen SCN is referred to as a "first end portion $MF_{1S}$ of the plane mirror MF" (i.e., it is also a part that the image light traveling from the first end portion $MC4_{1S}$ of the fourth mirror MC4 reaches). On the other hand, in the reflection surface s11, an end portion that is farthest from the screen SCN (an end portion that is opposed to the first end portion $MF_{1S}$ of the plane mirror MF) is referred to as a "second end portion $MF_{2S}$ of the plane mirror MF" (i.e., it is also a part that the image light traveling from the second end portion $MC4_{2S}$ of the fourth mirror MC4 reaches).

In addition, this plane mirror MF can lead the image light directly to the screen SCN without using other optical elements. Therefore, it is desirable that an angle between the reflection surface s11 of the plane mirror MF and the screen surface si of the screen SCN be 90 degrees or less.

The screen SCN displays image light led by the projection optical system PS and the plane mirror MF on the screen surface (surface of projection) si.

Furthermore, in the screen surface si, an end portion that is nearest to the plane mirror MF is referred to as a "first end portion $SCN_{1S}$ of the screen SCN" (i.e., it is also a part that the image light traveling from the first end portion $MF_{1S}$ of the plane mirror MF reaches). On the other hand, in the screen surface si, an end portion that is farthest from the plane mirror MF (an end portion that is opposed to the first end portion $SCN_{1S}$ of the screen surface si) is referred to as a "second end portion $SCN_{2S}$ of the screen SCN" (i.e., it is also a part that the image light traveling from the second end portion $MF_{2S}$ of the plane mirror MF reaches).

The light shielding plate (light shielding member) ST shields and prevents the image light that deviates from the optical path from the projection optical system PS to the screen SCN via the plane mirror MF (deviating light) from reaching the screen surface si. If the deviating light reaches the screen SCN, it causes deterioration of image quality of the projector PD. Therefore, the deviating light may be called ghost light.

Hereinafter, the ghost light will be described in detail. The ghost light is unnecessary light for the image projection, and there is a plurality of types of the ghost light. Some of them are as described below (see FIG. 4; however, the light shielding plate ST is omitted in FIG. 4 so as to show states where ghost light G1 and G2 are generated).

A first one is image light that deviates from the optical path entering the plane mirror MF (this image light deviating from the normal optical path is referred to as a first deviating light S1) and reaches the screen SCN directly among the image light traveling from the first end portion $MC4_{1S}$ of the fourth mirror MC4. This image light is referred to as first ghost light G1.

A second one is image light that deviates from the optical path entering the screen SCN (this image light deviating from the normal optical path is referred to as a second deviating light S2) and reaches the screen SCN after entering a holder member (not shown) of an optical element in the projection optical system PS (e.g., the third mirror MC3 or the first mirror MC1) and being reflected by it among the image light traveling from the second end portion $MF_{2S}$ of the plane mirror MF. This image light is referred to as second ghost light G2.

[2. An Example of Characteristics]

In the projector PD as described above, light (image light) modulated in a spatial manner by a micro mirror such as a DMD that is turned on and off in accordance with image data reaches the plane mirror MF through the projection optical system PS. In addition, the image light is reflected by the plane mirror MF so that its optical path is bent and reaches the screen SCN.

In other words, the projector PD includes a plurality of optical elements (such as a mirror and a lens), a projection optical system PS for emitting image light via the optical elements and a plane mirror MF for reflecting the image light from the projection optical system PS so as to lead the image light to screen SCN.

Furthermore, in this projector PD, the plane mirror MF is disposed at one end side of the end portion of the screen SCN (at the first end portion $SCN_{1S}$ side of the screen SCN), while the projection optical system PS is disposed at a position separated from the reflection surface s11 side of the plane mirror MF. In addition, an optical element that is disposed at a position that is nearest to the plane mirror MF side on the optical path of the projection optical system PS (an optical element at the last end of the optical path in the projection optical system PS) is the fourth mirror MC4.

Particularly, in the projector PD, a single light shielding plate ST is disposed at a position that is close to both the outer side of the optical path from the fourth mirror MC4 to the plane mirror MF and the outer side of the optical path from the plane mirror MF to the screen SCN. In other words, the light shielding plate ST is located in the space surrounded by the reflection surface s10$ of the fourth mirror MC4, the reflection surface s11 of the plane mirror MF and the screen surface si of the screen SCN. Therefore, this light shielding plate ST can shield part of image light traveling in the projector PD.

For example, if the light shielding plate ST is disposed at a position that is relatively close to the first end portion ($MC4_{1S}$ and $MF_{1S}$) in the optical path from the fourth mirror MC4 to the plane mirror MF, in other words, if the light shielding plate ST is disposed at a position that is close to the optical path of the image light traveling from the first end portion $MC4_{1S}$ of the fourth mirror MC4 (first image light IL1), the first deviating light S1 deviating from the optical path can be shielded by the light shielding plate ST. Therefore, the first ghost light G1 that travels from the fourth mirror MC4 and enters the screen SCN is not generated.

Furthermore, in the case of a thin type projector PD, if the light shielding plate ST is disposed between the fourth mirror MC4 and the plane mirror MF (particularly, if the light shielding plate ST is disposed between the optical path from the fourth mirror MC4 to the plane mirror MF and the screen SC), the light shielding plate ST is positioned also between the plane mirror MF and the screen SCN (in other word, the light shielding plate ST is positioned between the optical path from the plane mirror MF to the screen SC and the fourth mirror MC4). Thus, the light shielding plate ST can shield part of the image light traveling from the plane mirror MF.

For example, if the light shielding plate ST is disposed at a position that is relatively close to the second end portion ($MF_{2S}$ and $SCN_{2S}$) in the optical path from the plane mirror MF to the screen SCN, in other words, if the light shielding plate ST is disposed at a position that is close to the optical path of the image light traveling from the second end portion $MF_{2S}$ of the plane mirror MF (second image light IL2), the second deviating light S2 deviating from the optical path can be shielded by the light shielding plate ST. Therefore, the second ghost light G2 due to reflection of the deviating image light reflected by the holder member of the projection optical system PS is not generated.

In other words, the projector PD is provided with the light shielding plate ST that shields image light deviating from the normal optical path (the first deviating light S1 and the second deviating light S2) that causes ghost light G1 and G2. Therefore, the projector PD can realize high image quality by suppressing generation of the ghost light G1 and G2.

The first image light IL1 described above can be said as image light that enters the screen surface si of the screen SCN at the side that is nearest to the plane mirror MF among the image light that travels from the fourth mirror MC4 via plane mirror MF and enters the screen SCN. On the other hand, the second image light IL2 can be said as image light that enters the screen surface si of the screen SCN at the side that is farthest from the first image light IL1.

The position of the light shielding plate ST in the projector PD can also be described in detail by using the first image light IL1 and the second image light IL2 shown in FIG. 5. More specifically, the light shielding plate ST is located in the space (first space SPACE1) that is separated from the intersection P of the first image light IL1 traveling from the fourth mirror MC4 to the plane mirror MF and the second image light IL2 traveling from the plane mirror MF to the screen SCN and that is outside the optical path from the fourth mirror MC4 (projection optical system PS) to the plane mirror MF as well as the optical path from the plane mirror MF to the screen SCN.

As shown in FIGS. 4 and 5, the first space SPACE1 is a space where the first deviating light S1 that deviates from the normal optical path and causes the first ghost light G1 as well as the second deviating light S2 that deviates from the normal optical path and causes the second ghost light G2 pass through (or present). Therefore, if the light shielding plate ST is disposed in this first space SPACE1 (more specifically, if the light shielding plate ST is disposed at a position close to the normal optical path in this first space SPACE1), the light shielding plate ST can shield both the first deviating light S1 and the second deviating light S2 so that generation of the first ghost light G1 and the second ghost light G2 can be suppressed. In other words, the single light shielding plate ST can shield the both deviating light S1 and S2 instead of disposing a plurality of light shielding plate for shielding the first deviating light S1 and the second deviating light S2 separately.

If the light shielding plate ST is disposed at the position that is closest to the plane mirror MF (or closest to the intersection P) in the first space SPACE1, the first deviating light S1 and the second deviating light S2 can be shielded most effectively (note that the first space SPACE1 in FIG. 5 merely illustrates a part of the first space SPACE1).

In addition, the intersection P is the intersection of the outer side edge of the optical path from the fourth mirror MC4 to the plane mirror MF and the outer side edge of the optical path from the plane mirror MF to the screen SCN. Therefore, if the light shielding plate ST is disposed at the position that is close to the intersection P, a size of the light shielding plate ST can be relatively small. In other words, even a small light shielding plate ST can shield the first deviating light S1 and the second deviating light S2 sufficiently.

The projector PD shown in FIG. 2 has a structure in which the plane mirror MF is disposed at a position that is close to the ceiling of the projector PD so that the plane mirror MF reflects the image light. Therefore, this type of projector PD may be called a "ceiling reflection type".

In the case of this ceiling reflection type projector PD, an intersection of an imaginary line $LN_{IL1}$ extending in the same direction as the normal direction to the screen surface si from a position in the plane mirror MF where the first image light IL1 reaches and a screen imaginary plane $SU_S$ that is an extended plane of the screen surface si of the screen SCN is referred to as an intersection A. The shortest distance between the intersection A and the screen SCN is denoted by d, and a length of the screen SCN in the direction along the direction of this shortest distance d is denoted by h. Then, it is preferable to satisfy the conditional expression (1) below (see FIG. 1).

$$0 < d/h < 0.1 \tag{1}$$

Within the range that satisfies the conditional expression (1), it is more preferable to satisfy the conditional expression (1a) below.

$$0.01 < d/h < 0.05 \tag{1a}$$

These conditional expressions (1) and (1a) defines a balance between a size of the projector PD and location accuracy of the light shielding plate ST.

For example, if a value of d is so small that a value of d/h in the conditional expression (1) or (1a) becomes smaller than a lower limit value, the first end portion $MF_{1S}$ of the plane mirror MF becomes close to the first end portion $SCN_{1S}$ of the screen SCN. As a result, part of the image light traveling from the fourth mirror MC4 to the plane mirror MF (e.g., the first image light IL1) can enter the screen SCN directly without entering the plane mirror MF. Such a phenomenon has the same meaning as an increase of the first ghost light G1. Therefore, it is necessary to shield precisely the first deviating light S1 that can be a source of the first ghost light G1. In other words, it is necessary to improve the location accuracy of the light shielding plate ST exceedingly.

On the other hand, if a value of d is so large that a value of d/h in the conditional expression (1) or (1a) becomes larger than an upper limit value for example, a distance F1 between the end portion of a case of the projector PD and the first end portion $SCN_{1S}$ of the screen SCN shown in FIG. 2 will be increased. If the distance F1 is increased in this way, it is difficult to obtain a characteristic of the projector PD that is a compact size despite of a large screen.

If values of d and h are selected so as to satisfy the conditional expression (1) or (1a), the projector PD can have a relatively small size while location accuracy of the light shielding plate ST is relatively relieved (i.e., while flexibility of location is secured).

Note that d is 16.3 mm and h is 526.2 mm in the case of a projector PD, and a value of d/h in the conditional expression (1) is 0.031.

There is another conditional expression for defining a balance between a size of the projector PD and location accuracy of the light shielding plate ST, which is preferably satisfied for realizing a more preferable projector PD. For example, among values of angle between the normal to the screen surface si of the screen SCN and the image light entering the screen SCN from the plane mirror MF, a maximum angle is denoted by θmax (Unit; degrees), and a minimum angle is denoted by θmin (Unit; degrees). Then, it is desirable that the projector PD satisfy the conditional expression (2) below (see FIG. 1).

$$10 < \theta max - \theta min < 50 \tag{2}$$

If a value of θmax−θmin becomes smaller than a lower limit value, the optical path that is necessary when a size of the screen SCN is increased becomes long, so that thickness (depth) of the projector PD and "under-chin" (a distance F2 between the lower end of the screen SCN and the lower end of the device shown in FIG. 2) may increase.

On the other hand, if a value of θmax−θmin becomes larger than an upper limit value, an angle of incidence of the light entering the plane mirror MF from the fourth mirror M4 becomes large. As a result, light emitted from the fourth mirror M4 can easily deviate from the optical path for entering the plane mirror MF and can enter directly to the screen SCN easily. Such a phenomenon has the same meaning as an increase of the first ghost light G1. Therefore, it is necessary to shield precisely the first deviating light S1 that can be a source of the first ghost light G1.

If the values of θmax and θmin are selected so as to satisfy the conditional expression (2), the projector PD can realize a relatively small size while relieving location accuracy of the light shielding plate ST relatively (i.e., securing flexibility of location).

In the case of the projector PD, θmax is 69.58, θmin is 47.14, and the value of θmax−θmin in the conditional expression (2) is 22.44. Furthermore, angle of incidence θcenter of the image light entering the screen SCN at the center position in the height direction is 60.86 (Unit; degrees).

In addition, among the range satisfying the conditional expression (2), it is more preferable to satisfies the conditional expression (2a) below.

$$15 < \theta max - \theta min < 35 \tag{2a}$$

[3. Construction Data of Projector]

The construction data about the projector PD described above is as shown in Tables 1-13 below.

However, the arrangements of the optically acting surfaces are indicated by an origin (O) of a local orthogonal coordinate system (X, Y, Z) as its surface vertex, an origin (O) of a local orthogonal coordinate system (X, Y, Z) in a global orthogonal coordinate system (x, y, z), and coordinates data (x, y, z) (Unit; mm) of a coordinate axial vector (VX) of the X-axis and a coordinate axial vector (VY) of the Y-axis.

Figure 3:
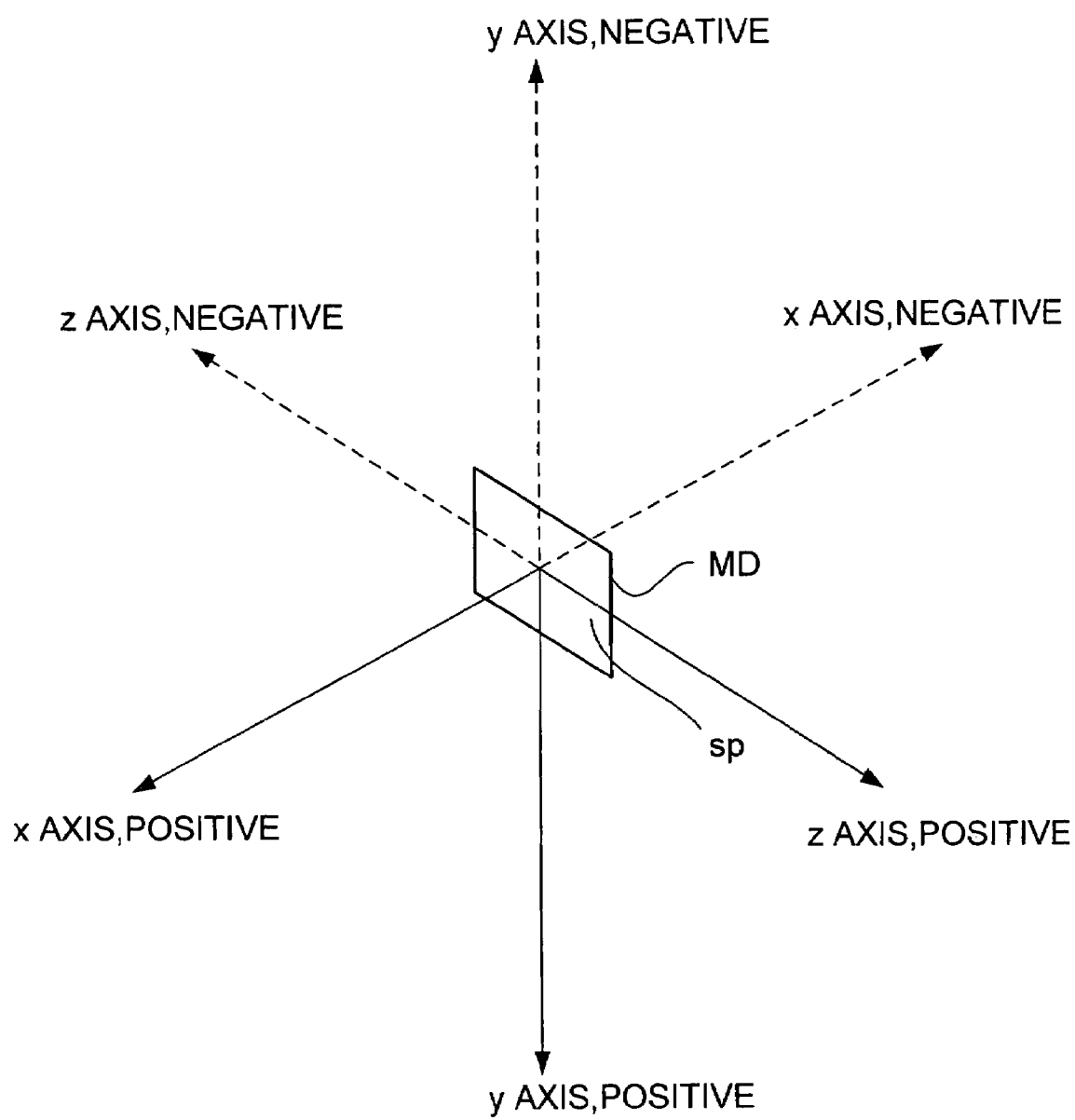
FIG. 3 is a perspective view showing a xyz orthogonal coordinate system.

Note that every coordinate is defined by the right-handed system, and that the global orthogonal coordinate system (x, y, z) is an absolute coordinate system that matches the local orthogonal coordinate system (X, Y, Z) of the panel display surface sp. Therefore, as shown in FIG. 3, the origin (o) of the global orthogonal coordinate system (x, y, z) is the same point as the origin (O) that is located at the center of the panel display surface sp. A vector VX in the panel display surface sp is parallel with the normal to the panel display surface sp. The vector VY is orthogonal to the vector VX and is parallel with a short side of the panel display surface sp.

In addition, as to the optically acting surface that constitutes a part of a co-axial system with a leading optically acting surface indicated by the coordinates data (x, y, z), the arrangement of the optically acting surface is indicated by a distance T' (Unit; mm) between surfaces on the axis in the x direction with respect to the just previous optically acting surface.

In addition, a surface shape of each optically acting surface is indicated by curvature CO (Unit; $mm^{-1}$), radius of curvature r (Unit; mm) or the like of the optical surface. Moreover, in the case of the optically acting surface having an aspheric surface of rotational symmetry with the suffix sign "*", its surface shape is defined by the equation (AS) below using the local orthogonal coordinate system (X, Y, Z) with a surface vertex as its origin (O). In addition, in the case of an optically acting surface having an aspheric surface of rotational asymmetry with the suffix sign "$" (a so-called free-form surface), its surface shape is defined by the equation (BS) below using the local orthogonal coordinate system (X, Y, Z) with a surface vertex as its origin (O). Here, the rotational symmetry aspheric data and the rotational asymmetry aspheric data are also shown. Note that a coefficient of a term without indication is zero, and $E-n = \times 10^{-n}$ for all data.

$$X = (CO \cdot H^2)/[1 + \sqrt{(1 - \epsilon \cdot CO^2 \cdot H^2)}] + \Sigma[A(i) \cdot H^i] \quad (AS)$$

$$X = (CO \cdot H^2)/[1 + \sqrt{(1 - \epsilon \cdot CO^2 \cdot H^2)}] + \Sigma[G(j,k) \cdot Y^j \cdot Z^k] \quad (BS)$$

Here,

X denotes a variation from a reference plane in the x direction at a position of height H (surface vertex reference), H denotes height in the direction perpendicular to the X-axis [$H = \sqrt{(Y^2 + Z^2)}$], CO denotes curvature at the surface vertex (+/− is with respect to the X-axis of the local orthogonal coordinate system; +means that the center of the curvature exists in the positive direction on the vector VX; CO=1/r), $\epsilon$ denotes a parameter of a quadric surface, A(i) denotes a coefficient of an i-order aspheric surface of rotational symmetry, G(j,k) denotes a coefficient of an aspheric surface of rotational asymmetry in j-order of Y and in k-order of Z.

In addition, N denotes a refractive index of a medium located on the incident side of each optically acting surface with respect to the d line, and N' denotes a refractive index of a medium located on the emission side of each optically acting surface with respect to the d line. Note that the value of N' becomes negative if the optically acting surface is a reflection surface. Moreover, vd denotes an Abbe number of an optical material (in the case of air, that effect is indicated).

Note that a screen shape of the panel display surface sp is rectangular in which length of the short side (y direction) is 5.508 mm while length of the long side (z direction) is 9.784 mm. In addition, horizontal magnification (β) of the projection optical system PS is 95.03, an F number in the vertical direction (y direction) (FnoY) is 2.83, and an F number in the horizontal direction (z direction) (FnoZ) is 2.81.

Another Embodiment

Note that the present invention is not limited to the embodiment described above and that the structure can be modified variously within the scope of the present invention.

For example, the light shielding plate ST is disposed at the position that is close to both the outer side of the optical path from the fourth mirror MC4 to the plane mirror MF and the outer side of the optical path from the plane mirror MF to the screen SCN in the projector PD shown in FIG. 1. However, the projector PD of the present invention is not limited to this structure.

For example, the projector PD of the present invention can be one in which the light shielding plate ST is disposed at a position that is close to only the outer side of the optical path from the fourth mirror MC4 to the plane mirror MF or only the outer side of the optical path from the plane mirror MF to the screen SCN.

Therefore, the present invention includes the structure of the projector PD in which the light shielding plate ST is disposed at a position that is close to at least one of the outer side of the optical path from the fourth mirror MC4 to the plane mirror MF and the outer side of the optical path from the plane mirror MF to the screen SCN.

However, it is preferable that the light shielding plate ST is disposed in an overlapping space between the space that occupies between the optical path from the fourth mirror MC4 to the plane mirror MF and the screen SCN, and the space that occupies between the optical path from the plane mirror MF to the screen SCN and the fourth mirror MC4 (a gap space, i.e., the first space SPACE1), because the single light shielding plate ST can shield the plurality of deviating light (the first deviating light S1 and the second deviating light S2). Then, in short, it is sufficient that the light shielding plate ST is located at the position that can prevent the deviating light causing the ghost light or the ghost light itself from reaching the screen SCN.

In addition, the projector PD is not limited to the type shown in FIG. 1, in which the light modulation element MD is located at the lower end side of the screen SCN while the plane mirror MF is located at the upper end position of the screen SCN. For example, the present invention can be applied also to a projector PD in which the relative position between the plane mirror MF and the projection optical system PS is opposite (upside down) to the structure shown in FIG. 1 or a projector PD in which the plane mirror MF and the projection optical system PS are disposed side by side (in the horizontal direction).

Although the projection optical system PS of the projector PD shown in FIG. 1 includes lenses L1 and L2 with substantially non-power for a purpose of various aberration corrections, the present invention is not limited to this structure. For example, it is possible to adopt a structure in which the projection optical system includes a lens or the like (transmission type optical element) with power. More specifically, the projection optical system may be equipped with an optical system (a refraction optical system) including a lens or the like with a power and an optical system (a reflection optical system) including a reflection type optical element such as a mirror or the like.

In general, when a reflection type optical element with a power is disposed at a position that is closest to the screen in the projection optical system, it is difficult to design the optical system to restrict a light beam like the case where a projection lens is used. Therefore, ghost light can be shielded effectively if the light shielding plate ST is used inside the projector PD.

Although it is difficult to understand from FIG. 1 (an xy cross section in the vicinity of the center of the screen surface), the first image light IL1 in the plane mirror MF reaches the plane mirror MF substantially like a line on the plane mirror MF. Therefore, "d" and "h" used in the conditional expression (1) can be defined also as follows.

A nodal line of an imaginary plane $SU_{IL1}$ that is a plane extending in the same direction as the normal direction to the screen surface si from the part like a line on the plane mirror MF where the first image light IL1 reaches (an imaginary plane having a plane that is parallel with normal to the screen surface si; not shown) and a screen imaginary plane $SU_S$ that is an extended plane of the screen surface si of the screen SCN is a nodal line AA (not shown). A shortest distance between the nodal line AA and the screen SCN is denoted by d, and a length of the screen SCN in the direction along the direction of the shortest distance d is denoted by h. Then, it is preferable to satisfy the conditional expression (1) described above.

In addition, if the projection optical system includes a reflection type optical element, the reflection type optical element is not limited to a mirror but can be a prism having a curved reflection surface or a plane reflection surface, for example. Alternatively, it is possible to use one or more reflection type optical elements having a plurality of reflection surfaces. Furthermore, it is possible to use an optical element having a reflection surface, a refraction surface, or a diffraction surface, or an optical element having a combination of the surfaces described above.

In addition, if the projection optical system includes a transmission type optical element, a refraction lens having a curved surface refraction surface or a refraction type lens that deflects an incident light beam by its refracting function (a lens having an interface between media having different refractive indexes at which the deflection is performed) may be used. Alternatively, for example, a diffraction type lens that deflects an incident light beam by its diffracting function, a refraction and diffraction hybrid type lens that deflects an incident light beam by its combination function of refraction and diffraction, a refractive index distribution type lens that deflects an incident light beam by a refractive index distribution in its medium, or other transmission type optical element may be used.

In addition, the shape of the light shielding plate ST is not limited to the specific shape. More specifically, instead of the plate-like light shielding member, a light shielding member having another shape may be used as long as it can shield the deviating lights S1 and S2 so that generation of the ghost light G1 and G2 can be suppressed.

Figure 6:
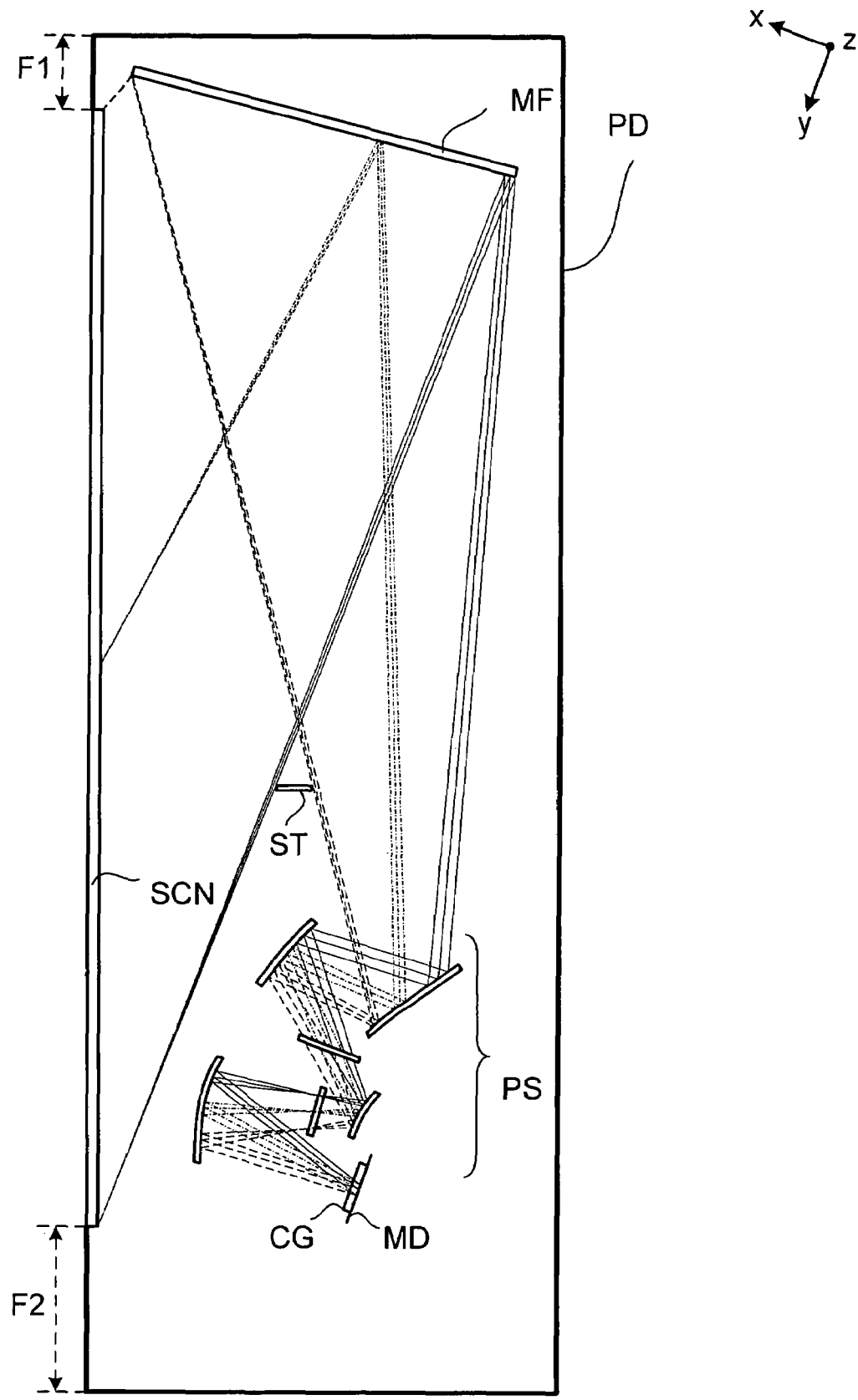
FIG. 6 is a cross section showing another example of the image projection apparatus shown in FIG. 2.
Figure 7:
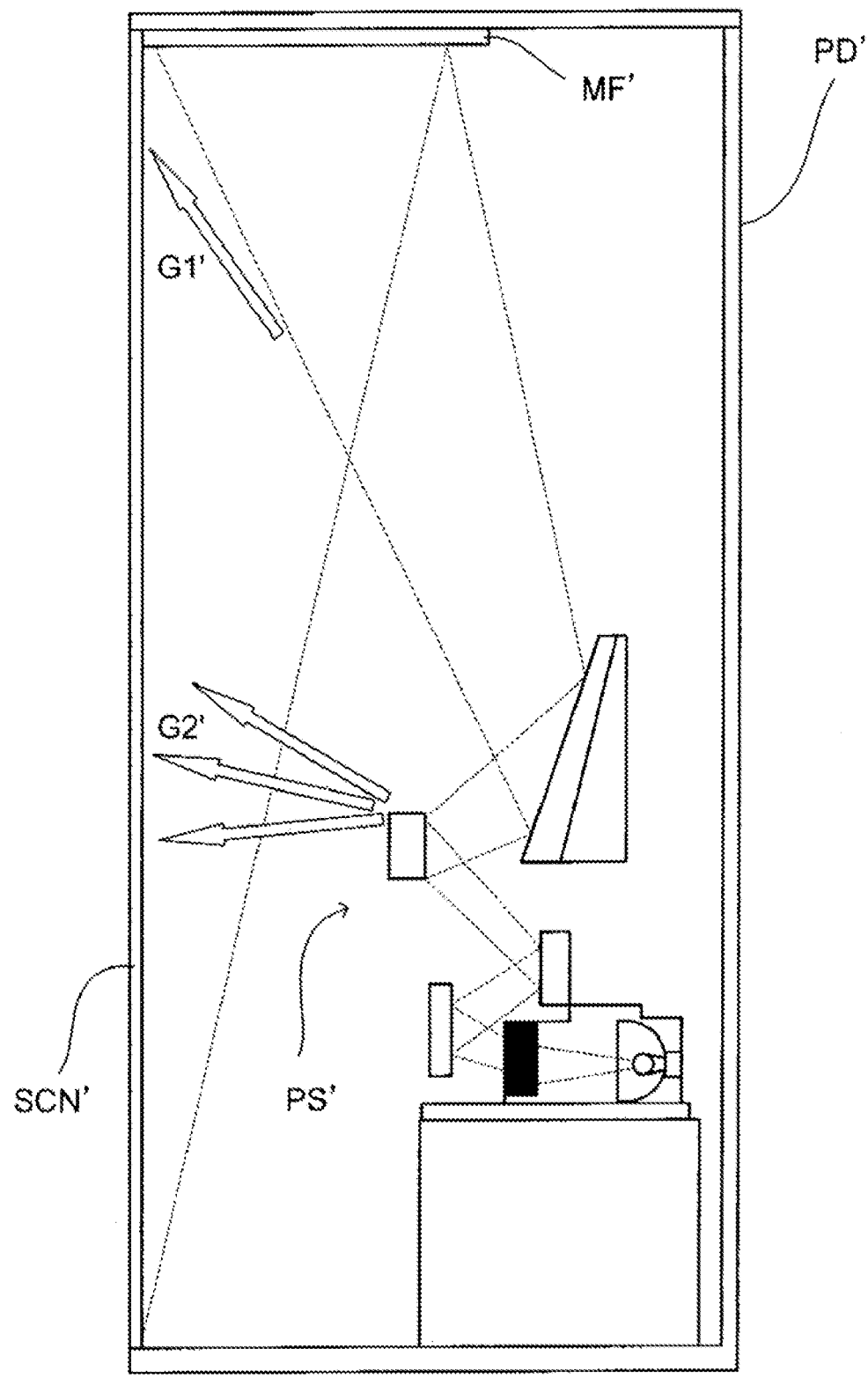
FIG. 7 is a diagram showing a schematic structure of a conventional image projection apparatus.

In addition, the orientation (direction) of the light shielding plate ST is not limited to the specific orientation. For example, the thickness direction of the light shielding plate ST is perpendicular to the extension direction of the length h of the screen SCN in FIG. 1. However, it is possible to adopt the structure shown in FIG. 6, in which the thickness direction of the light shielding plate ST is the same direction as the extension direction of the length h of the screen SCN. In short, any orientation of the light shielding plate ST may be adopted as long as it can shield the deviating lights S1 and S2 so that generation of the ghost light G1 and G2 can be suppressed.

In the description described above, the image projection apparatus has a structure in which the light modulation element MD side is the reduction side while the screen SCN side is the enlargement side, and enlargement projection is performed onto the screen SCN from an oblique direction. However, the structure of the projector PD using the light shielding plate ST can be applied also to an image reading apparatus that performs reduction projection. In this case, the panel display surface sp of the light modulation element MD corresponds to a light receiving surface of a light receiving element for reading images (for example, a CCD or a charge coupled device), and the surface of projection si of the screen SCN corresponds to an image surface (for example, an original surface) of an image to be read.

The projector PD described above can be expressed also as below.

The image projection apparatus is equipped with a projection optical system including a plurality of optical elements for emitting image light via the optical elements, and a mirror for reflecting the image light from the projection optical system so as to lead the image light to a screen (e.g., a single mirror). The mirror is disposed at one end side of an end portion of the screen, while the projection optical system is disposed at a position separated from a reflection surface side of the mirror. In addition, one of the optical elements disposed at a position that is closest to the mirror in the optical path of the projection optical system is a reflection type optical element.

In this image projection apparatus, the reflection type optical element that is separated from the reflection surface side of the mirror leads the image light to the mirror by reflecting the image light. In this case, however, the image light that is to travel to the mirror may deviate from the optical path and enter the screen directly (this deviating image light is referred to as the first deviating light). In addition, the mirror leads the image light traveling from the reflection type optical element to the screen. In this case, the image light that is to travel to the screen may deviate from the optical path and enter a holder member or the like of the projection optical system that is disposed at a position separated from the mirror (this deviating image light is referred to as the second deviating light).

Such deviating light is not light that contributes to the image projection but is rather light that causes deterioration of image quality (ghost light) when it enters the screen. Therefore, the light shielding member is disposed in the space enclosed by the reflection surface side of the reflection type optical element, the reflection surface side of the mirror and the surface of projection side of the screen in the image projection apparatus so as to prevent the image light (deviating light) that deviates from the optical path from reaching the screen. More specifically, the light shielding member is disposed at the position that is close to at least one of the outer side of the optical path from the reflection type optical element to the mirror and the outer side of the optical path from the mirror to the screen.

For example, if the light shielding member is disposed at a position that is close to the outer side of the optical path from the reflection type optical element to the mirror, it can be located between the reflection type optical element and the mirror so that the image light deviating from the optical path from the reflection type optical element to the mirror (the first deviating light) can be shielded by the light shielding member.

On the other hand, if the light shielding member is disposed at a position that is close to the outer side of the optical path from the mirror to the screen, it can be located between the mirror and the screen so that the image light deviating from the optical path from the mirror to the screen (the second deviating light) can be shielded by the light shielding member.

More specifically, since the light shielding plate is disposed at the position that is at least one of between the reflection type optical element and the mirror and between the mirror and the screen, the image light (deviating light) that deviates from the normal optical path between them can be cut off. Therefore, the ghost light due to the deviating light cannot be generated, so that deterioration of the image quality in the image projection apparatus is hardly generated.

Note that there is a preferred position for the light shielding member. As description of this position, among the image light that enters the screen from the reflection type optical element via the mirror, the image light that enters the surface of projection of the screen at a position that is closest to the mirror is the first image light while the image light that enters the surface of projection of the screen at a position that is farthest from the first image light is the second image light. Then, the light shielding member is disposed preferably at the following position.

It is preferable that the light shielding member is disposed in the first space that is separated from the intersection of the first image light traveling from the reflection type optical element to the mirror and the second image light traveling from the mirror to the screen and that is outside the optical path from the reflection type optical element to the mirror as well as the optical path from the optical path from the mirror to the screen.

This first space is a space through which the first deviating light and the second deviating light can pass through. Therefore, if the light shielding member is disposed in this first space, the single (the same) light shielding member can shield the first deviating light and the second deviating light that are traveling. In other words, the image projection apparatus that can suppress generation of the ghost light effectively can be realized.

Note that the light shielding member can shield the first deviating light and the second deviating light with highest effectiveness if it is disposed at a position that is closet to the mirror in the first space.

When the intersection of the imaginary line extending in the same direction as the normal direction to the surface of projection of the screen from the position in the mirror where the first image light reaches and the screen imaginary plane that is the extended plane of the surface of projection of the screen is referred to as the intersection A. The shortest distance between the intersection A and the screen is denoted by d, and a length of the screen in the direction along the direction of the shortest distance d is denoted by h. Then, it is preferable that the image projection apparatus satisfies the conditional expression (1) below.

$$0 < d/h < 0.1 \quad (1)$$

This conditional expression (1) defines a balance between a size of the image projection apparatus and location accuracy of the light shielding member. More specifically, if the value of d/h becomes above the upper limit value, the distance d becomes relatively large compared with the length h of the screen. Therefore, it causes a large size of the image projection apparatus if the distance d corresponds to one direction (e.g., the height direction) of the image projection apparatus.

Then, as long as the conditional expression (1) is satisfied, the image projection apparatus can have a relatively small size while relieving location accuracy of the light shielding member relatively.

In addition, among values of angle between the normal to the projection surface of the screen and the image light entering the screen from the mirror, a maximum angle is denoted by $\theta$max, and a minimum angle is denoted by $\theta$min. Then, it is desirable that the image projection apparatus satisfy the conditional expression (2) below.

$$10 < \theta max - \theta min < 50 \quad (2)$$

If a value of $\theta$max−$\theta$min becomes smaller than the lower limit value, the optical path that is necessary when a size of the screen is increase becomes long, so that thickness (depth) of the image projection apparatus and "under-chin" (a distance between the lower end of the screen and the lower end of the image projection apparatus) may increase.

On the other hand, if a value of $\theta$max−$\theta$min becomes larger than an upper limit value, an angle of incidence of the light entering the mirror from the reflection type optical element becomes large. As a result, the first deviating light may be generated so that the ghost light is apt to be generated. Therefore, the light shielding member must be disposed precisely.

Then, as long as the conditional expression (2) is satisfied, similarly to the case within the range of the conditional expression (1), the image projection apparatus can have a relatively small size while relieving location accuracy of the light shielding member relatively. Note that if the image projection apparatus satisfies both the conditional expression (1) and the conditional expression (2), it can obtain a larger effect.

In addition, the image projection apparatus includes an image display element for displaying a two-dimensional image, a projection optical system for projecting an image on the image display element to a screen from an oblique direction, a plane mirror for reflecting image light from the projection optical system toward the screen, and a light shielding member.

Furthermore, in this image projection apparatus, the projection optical system includes a reflection type optical element disposed at a position that is closest to the screen in the optical path of the projection optical system. In addition, the plane mirror is disposed at one end side of the screen in a position substantially perpendicular to the screen surface. Furthermore, the light shielding member is disposed at a position that is close to an intersection of an optical paths of first image light that is projected from the projection optical system via the plane mirror to an end portion of the screen facings the plane mirror and second image light that is projected from the projection optical system via a plane mirror to an end portion of the screen facing opposed to an end portion of the screen facing the plane mirror, and that is located outside the optical path of the projection optical system and adjacent to the optical paths of the first image light and the second image light.

Note that the projection optical system of the image projection apparatus preferably includes a refractive optical element.

In addition, the projection optical system preferably includes a first reflection surface with a concave surface, a second reflection surface with a convex surface, a third reflection surface with a curved surface and a fourth reflection surface with a curved surface in this order from the image display element side. Furthermore, this projection optical system preferably includes a refractive optical element, and the refractive optical element is preferably disposed between the above-mentioned reflection surfaces.

Alternatively, this projection optical system is preferably includes a first refractive optical element and a second refractive optical element. The first refractive optical element is preferably disposed between the first reflection surface and the second reflection surface, and the second refractive optical element is disposed between the second reflection surface and the third reflection surface.

It is preferable that the light shielding member shields light that enters the screen directly without entering the plane mirror among light emitted from the projection optical system. In addition, it is preferable that the light shielding member shields light that is reflected by the holder member for retaining the optical element with the first reflection surface or by the holder member for retaining the optical element with the third reflection surface among light reflected by the plane mirror.

The embodiments and examples described above in a concrete manner should be regarded as descriptions for a purpose of understanding the technical contents of the present invention. Therefore, the present invention should not be interpreted in a narrow meaning limited to the concrete examples, but the present invention can be modified for embodiment within the scope of the attached claims.

TABLE 1 sp

| | | x | y | z |
|---|---|---|---|---|
| Coordinates | O | 0.00000 | 0.00000 | 0.00000 |
| | VX | 1.00000000 | 0.00000000 | 0.00000000 |
| | VY | 0.00000000 | 1.00000000 | 0.00000000 |
| Distance between surfaces on axis | T' | 0.47 | | |
| Curvature | CO | 0.00000000 (r = ∞) | | |
| Medium of incident side | N vd | 1.00000 Air | | |
| Medium of emission side | N' vd | 1.00000 Air | | |

TABLE 2 s1

| Distance between surfaces on axis | T' | 3.00 |
|---|---|---|
| Curvature | CO | 0.00000000 (r = ∞) |
| Medium of incident side | N vd | 1.00000 Air |
| Medium of emission side | N' vd | 1.51872 64.20 |

TABLE 3 s2

| Curvature | CO | 0.00000000 (r = ∞) |
|---|---|---|
| Medium of incident side | N vd | 1.51872 64.20 |
| Medium of emission side | N' vd | 1.00000 Air |

TABLE 4 s3

| | | x | y | z |
|---|---|---|---|---|
| Coordinates | O | 84.77600 | −8.80205 | 0.00000 |
| | VX | 0.99335574 | 0.11508424 | 0.00000000 |
| | VY | −0.11508424 | 0.99335574 | 0.00000000 |
| Curvature | CO | −0.01024430 (r = −97.6153) | | |
| Medium of incident side | N vd | 1.00000 Air | | |
| Medium of emission side | N' vd | −1.00000 Air | | |

TABLE 5 s4*

| | | x | y | z |
|---|---|---|---|---|
| Coordinates | O | 33.18400 | −26.78580 | 0.00000 |
| | VX | −0.99802020 | −0.06289414 | 0.00000000 |
| | VY | −0.06289414 | 0.99802020 | 0.00000000 |
| Curvature | CO | 0.00000000 (r = ∞) | | |
| Medium of incident side | N vd | 1.00000 Air | | |
| Medium of emission side | N' vd | 1.52729 56.38 | | |
| Aspheric data | ε | 1.00000 | | |
| | A(4) | 1.73282E−06 | | |
| | A(6) | −2.51393E−08 | | |
| | A(8) | 5.83430E−10 | | |
| | A(10) | −6.49544E−12 | | |
| | A(12) | 2.72743E−14 | | |

TABLE 6 s5

| | | x | y | z |
|---|---|---|---|---|
| Coordinates | O | 31.23500 | −27.67100 | 0.00000 |
| | VX | −0.99802020 | −0.06289414 | 0.00000000 |
| | VY | −0.06289414 | 0.99802020 | 0.00000000 |
| Curvature | CO | 0.00000000 (r = ∞) | | |
| Medium of incident side | N vd | 1.52729 56.38 | | |
| Medium of emission side | N' vd | 1.00000 Air | | |

TABLE 7 s6 *

| | | x | y | z |
|---|---|---|---|---|
| Coordinates | O | 13.34700 | −24.19590 | 0.00000 |
| | VX | −0.99395174 | 0.10981775 | 0.00000000 |
| | VY | 0.10981775 | 0.99395174 | 0.00000000 |
| Curvature | CO | 0.00931427 (r = 107.3621) | | |
| Medium of incident side | N vd | 1.00000 Air | | |
| Medium of emission side | N' vd | −1.00000 Air | | |
| Aspheric data | ε | 6.42234 | | |
| | A(4) | 1.41050E−06 | | |
| | A(6) | 8.58819E−10 | | |
| | A(8) | −2.64074E−12 | | |
| | A(10) | 5.41875E−15 | | |
| | A(12) | −4.40215E−18 | | |

TABLE 8 s7 $

| | | x | y | z |
|---|---|---|---|---|
| Coordinates | O | 34.67500 | −55.70520 | 0.00000 |
| | VX | 0.01157085 | −0.99993306 | 0.00000000 |
| | VY | 0.99993306 | 0.01157085 | 0.00000000 |
| Curvature | CO | 0.00000000 (r = ∞) | | |
| Medium of incident side | N vd | 1.00000 Air | | |

TABLE 8-continued s7 $

| | | x | y | z |
|---|---|---|---|---|
| Medium of emission side | N'<br>νd | | 1.52729<br>56.38 | |
| Aspheric data | ε<br>G(3, 0)<br>G(4, 0)<br>G(5, 0)<br>G(6, 0)<br>G(7, 0)<br>G(8, 0)<br>G(9, 0)<br>G(10, 0)<br>G(1, 2)<br>G(2, 2)<br>G(3, 2)<br>G(4, 2)<br>G(5, 2)<br>G(6, 2)<br>G(7, 2)<br>G(8, 2)<br>G(0, 4)<br>G(1, 4)<br>G(2, 4)<br>G(3, 4)<br>G(4, 4)<br>G(5, 4)<br>G(6, 4)<br>G(0, 6)<br>G(1, 6)<br>G(2, 6)<br>G(3, 6)<br>G(4, 6)<br>G(0, 8)<br>G(1, 8)<br>G(2, 8)<br>G(0, 10) | | 1.00000<br>8.61966E−06<br>−1.32367E−06<br>1.81013E−09<br>−2.38497E−09<br>3.31534E−10<br>−3.36791E−12<br>−7.71912E−13<br>2.42779E−14<br>−6.67440E−05<br>−2.40316E−06<br>8.97504E−08<br>3.54681E−10<br>4.62364E−10<br>−1.29461E−11<br>−6.77249E−13<br>2.31117E−14<br>2.46946E−06<br>2.06430E−07<br>−6.56518E−10<br>−1.59192E−11<br>−1.66117E−11<br>−6.92560E−13<br>3.52199E−14<br>−3.00301E−09<br>−1.27708E−10<br>2.16243E−12<br>6.36425E−13<br>4.02125E−15<br>5.95575E−12<br>2.69834E−13<br>−1.86336E−14<br>−1.57267E−14 | |

TABLE 9 s8

| | | x | y | z |
|---|---|---|---|---|
| Coordinates | O<br>VX<br>VY | 39.23600<br>0.01157085<br>0.99993306 | −57.65510<br>−0.99993306<br>0.01157085 | 0.00000<br>0.00000000<br>0.00000000 |
| Curvature | C0 | | 0.00000000 (r = ∞) | |
| Medium of incident side | N<br>νd | | 1.52729<br>56.38 | |
| Medium of emission side | N'<br>νd | | 1.00000<br>Air | |

TABLE 10 s9 $

| | | x | y | z |
|---|---|---|---|---|
| Coordinates | O<br>VX<br>VY | 69.48900<br>0.91941593<br>0.39328660 | −95.92290<br>−0.39328660<br>0.91941593 | 0.00000<br>0.00000000<br>0.00000000 |
| Curvature | C0 | | −0.00044085 (r = −2268.3247) | |
| Medium of incident side | N<br>νd | | 1.00000<br>Air | |

TABLE 10-continued s9 $

| | | x | y | z |
|---|---|---|---|---|
| Medium of emission side | N'<br>νd | | −1.00000<br>Air | |
| Aspheric data | ε<br>G(2, 0)<br>G(3, 0)<br>G(4, 0)<br>G(5, 0)<br>G(6, 0)<br>G(7, 0)<br>G(8, 0)<br>G(9, 0)<br>G(10, 0)<br>G(0, 2)<br>G(1, 2)<br>G(2, 2)<br>G(3, 2)<br>G(4, 2)<br>G(5, 2)<br>G(6, 2)<br>G(7, 2)<br>G(8, 2)<br>G(0, 4)<br>G(1, 4)<br>G(2, 4)<br>G(3, 4)<br>G(4, 4)<br>G(5, 4)<br>G(6, 4)<br>G(0, 6)<br>G(1, 6)<br>G(2, 6)<br>G(3, 6)<br>G(4, 6)<br>G(0, 8)<br>G(1, 8)<br>G(2, 8)<br>G(0, 10) | | 1.00000<br>2.80832E−04<br>−1.18927E−05<br>−8.73130E−07<br>−8.41805E−09<br>7.25923E−12<br>9.49225E−12<br>1.04654E−13<br>−2.19175E−14<br>7.21665E−16<br>−5.13986E−04<br>−8.55552E−05<br>−1.12351E−06<br>2.49379E−08<br>8.10459E−10<br>2.58668E−11<br>8.12093E−13<br>2.11287E−15<br>−1.19879E−15<br>1.17194E−06<br>5.41384E−08<br>3.65203E−10<br>−1.88985E−11<br>−1.18863E−12<br>−3.78949E−14<br>7.89270E−17<br>−9.29742E−11<br>3.36094E−13<br>1.04040E−12<br>3.77869E−14<br>2.03532E−15<br>−3.88723E−13<br>−1.38874E−15<br>−1.35813E−15<br>5.45906E−16 | |

TABLE 11 s10 $

| | | x | y | z |
|---|---|---|---|---|
| Coordinates | O<br>VX<br>VY | 23.67600<br>−0.99802624<br>0.06279831 | −62.46640<br>0.06279831<br>0.99802624 | 0.00000<br>0.00000000<br>0.00000000 |
| Curvature | C0 | | 0.05625150 (r = 17.7773) | |
| Medium of incident side | N<br>νd | | 1.00000<br>Air | |
| Medium of emission side | N'<br>νd | | −1.00000<br>Air | |
| Aspheric data | ε<br>G(2, 0)<br>G(3, 0)<br>G(4, 0)<br>G(5, 0)<br>G(6, 0)<br>G(7, 0)<br>G(8, 0)<br>G(9, 0)<br>G(10, 0)<br>G(0, 2)<br>G(1, 2) | | −1.54968<br>−1.89950E−03<br>−1.99289E−05<br>−4.72141E−07<br>−5.60670E−09<br>−2.08536E−11<br>1.58062E−13<br>2.17055E−15<br>6.89436E−18<br>−2.28380E−20<br>−4.18619E−03<br>−9.36187E−05 | |

TABLE 11-continued s10 $

| | x | y | z |
|---|---|---|---|
| G(2, 2) | | −2.59756E−06 | |
| G(3, 2) | | −4.09752E−08 | |
| G(4, 2) | | −4.09984E−10 | |
| G(5, 2) | | −3.01393E−12 | |
| G(6, 2) | | −1.36150E−14 | |
| G(7, 2) | | −3.03519E−17 | |
| G(8, 2) | | −9.24981E−20 | |
| G(0, 4) | | −2.04797E−07 | |
| G(1, 4) | | −3.13937E−09 | |
| G(2, 4) | | 1.41500E−10 | |
| G(3, 4) | | 2.53309E−12 | |
| G(4, 4) | | 1.03641E−14 | |
| G(5, 4) | | 6.70735E−17 | |
| G(6, 4) | | 5.85450E−19 | |
| G(0, 6) | | 1.66422E−10 | |
| G(1, 6) | | 4.93631E−12 | |
| G(2, 6) | | 2.84416E−14 | |
| G(3, 6) | | −1.43950E−16 | |
| G(4, 6) | | −2.85288E−18 | |
| G(0, 8) | | −6.93600E−14 | |
| G(1, 8) | | −1.98833E−15 | |
| G(2, 8) | | −4.60481E−18 | |
| G(0, 10) | | −9.75378E−18 | |

TABLE 12 s11

| | | x | y | z |
|---|---|---|---|---|
| Coordinates | O | 400.00000 | −441.69700 | 0.00000 |
| | VX | 0.10902324 | −0.99403920 | 0.00000000 |
| | VY | 0.99403920 | 0.10902324 | 0.00000000 |
| Curvature | C0 | | 0.00000000 (r = ∞) | |
| Medium of incident side | N vd | | 1.00000 Air | |
| Medium of emission side | N' vd | | −1.00000 Air | |

TABLE 13 si

| | | x | y | z |
|---|---|---|---|---|
| Coordinates | O | 204.75705 | −187.50166 | 0.00000 |
| | VX | 0.93901635 | 0.34387248 | 0.00000000 |
| | VY | −0.34387248 | 0.93901635 | 0.00000000 |

What is claimed is:

1. An image projection apparatus comprising:
a projection optical system including a plurality of optical elements for emitting image light via the optical elements; and
a mirror for reflecting the image light from the projection optical system so as to lead the image light to a screen, wherein
the mirror is disposed at one end side of an end portion of the screen, while the projection optical system is disposed at a position separated from a reflection surface side of the mirror,
one of the optical elements disposed at a position that is closest to the mirror in the optical path of the projection optical system is a reflection type optical element, and a light shielding member for shielding image light deviating from an optical path is disposed at a position that is close to at least one of the outer side of an optical path from the reflection type optical element to the mirror and the outer side of an optical path from the mirror to the screen,
wherein the following conditional expression (1) is satisfied:

$$0 < d/h < 0.1 \qquad (1),$$

where image light that enters a surface of projection of the screen at a position that is closest to the mirror among image light entering the screen from the reflection type optical element via the mirror is a first image light, and an intersection of an imaginary line extending in the same direction as the normal direction to the surface of projection of the screen from a position on the mirror where the first image light reaches and an screen imaginary plane that is an extended plane of the surface of projection of the screen is an intersection A,
d denotes a shortest distance between the intersection A and the screen, and
h denotes a length of the screen in the direction of the shortest distance.

2. The image projection apparatus according to claim 1, wherein the light shielding member shields image light that deviates from an optical path from the reflection type optical element to the mirror and travels toward the screen.

3. The image projection apparatus according to claim 1, wherein the light shielding member shields image light that deviates from an optical path from the mirror to the screen and travels toward a holder member of the projection optical system.

4. The image projection apparatus according to claim 1, wherein the light shielding member is located in a first space that is separated from an intersection of a first image light traveling from the reflection type optical element to the mirror and a second image light traveling from the mirror to the screen and exists outside the optical path from the reflection type optical element to the mirror as well as the optical path from the mirror to the screen,
where image light that enters a surface of projection of the screen at a position that is closest to the mirror among image light entering the screen from the reflection type optical element via the mirror is said first image light, and image light that enters the surface of projection of the screen at a position that is farthest from the first image light is said second image light.

5. The image projection apparatus according to claim 4, wherein the light shielding member is located at a position that is closest to the mirror in the first space.

6. An image projection apparatus comprising:
a projection optical system including a plurality of optical elements for emitting image light via the optical elements; and
a mirror for reflecting the image light from the projection optical system so as to lead the image light to a screen, wherein
the mirror is disposed at one end side of an end portion of the screen, while the projection optical system is disposed at a position separated from a reflection surface side of the mirror,
one of the optical elements disposed at a position that is closest to the mirror in the optical path of the projection optical system is a reflection type optical element, and a light shielding member for shielding image light deviating from an optical path is disposed at a position that is close to at least one of the outer side of an optical path from the reflection type optical element to the mirror and the outer side of an optical path from the mirror to the screen, wherein the conditional expression (2) below is satisfied:

$$10 < \theta max - \theta min < 50 \qquad (2),$$

where θmax denotes a largest angle, and
θmin denotes a smallest angle among angles between the normal to the surface of projection of the screen and image light that enters the screen from the mirror.

7. An image projection apparatus, comprising:
an image display element for displaying a two-dimensional image;
a projection optical system for projecting an image on the image display element to a screen from an oblique direction;
a plane mirror for reflecting image light from the projection optical system toward the screen; and
a light shielding member, wherein
the projection optical system includes a reflection type optical element disposed at a position that is closest to the screen on the optical path in the projection optical system,
the plane mirror is disposed at one end side of the screen in a position substantially perpendicular to the screen surface, and
the light shielding member is disposed at a position that is close to an intersection of an optical paths of first image light that is projected from the projection optical system via the plane mirror to an end portion of the screen facings the plane mirror and second image light that is projected from the projection optical system via a plane mirror to an end portion of the screen facing opposed to an end portion of the screen facing the plane mirror, and that is located outside the optical path of the projection optical system and adjacent to the optical paths of the first image light and the second image light,
wherein the projection optical system includes a first reflection surface with a concave surface, a second reflection surface with a convex surface, a third reflection surface with a curved surface, and a fourth reflection surface with a curved surface in this order from the image display element side, and
wherein the projection optical system includes a first refractive optical element and a second refractive optical element, the first refractive optical element is disposed between the first reflection surface and the second reflection surface, and the second refractive optical element is disposed between the second reflection surface and the third reflection surface.

8. The image projection apparatus according to claim 7,
wherein the light shielding member shields light that enters not the plane mirror but the screen directly among light emitted from the projection optical system.

9. The image projection apparatus according to claim 6,
wherein the light shielding member shields image light that deviates from an optical path from the reflection type optical element to the mirror and travels toward the screen.

10. The image projection apparatus according to claim 6,
wherein the light shielding member shields image light that deviates from an optical path from the mirror to the screen and travels toward a holder member of the projection optical system.

11. The image projection apparatus according to claim 6,
wherein the light shielding member is located in a first space that is separated from an intersection of a first image light traveling from the reflection type optical element to the mirror and a second image light traveling from the mirror to the screen and exists outside the optical path from the reflection type optical element to the mirror as well as the optical path from the mirror to the screen,
where image light that enters a surface of projection of the screen at a position that is closest to the mirror among image light entering the screen from the reflection type optical element via the mirror is said first image light, and image light that enters the surface of projection of the screen at a position that is farthest from the first image light is said second image light.

12. The image projection apparatus according to claim 11,
wherein the light shielding member is located at a position that is closest to the mirror in the first space.

* * * * *